Patented May 19, 1953

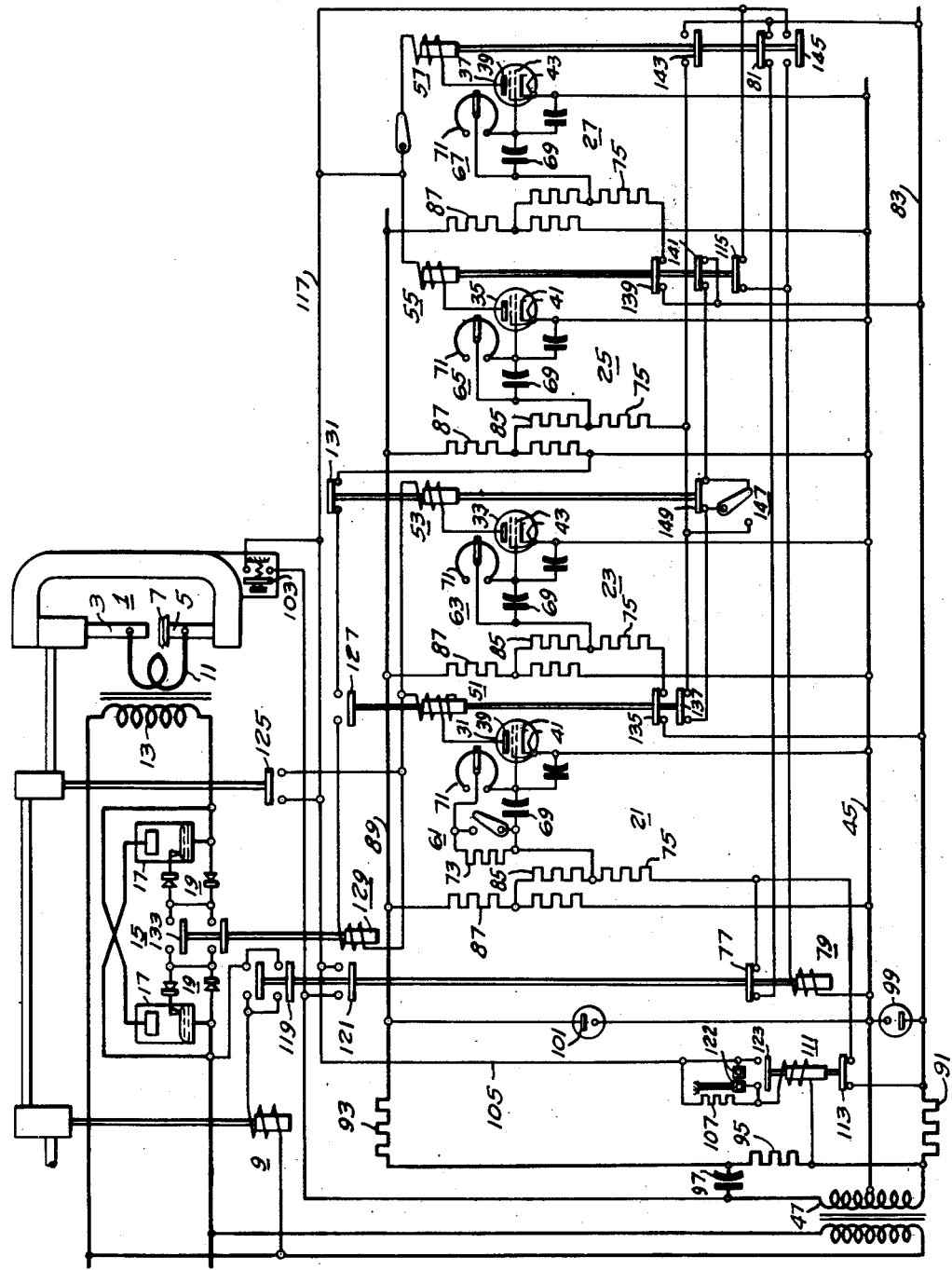

2,639,361

UNITED STATES PATENT OFFICE 2,639,361

TIMER FOR WELDING SYSTEMS

Edward C. Hartwig, Tonawanda, and Robert F. Barrell, Buffalo, N. Y., assignors to Westinghouse Electric Corporation, East Pittsburgh, Pa., a corporation of Pennsylvania Application April 2, 1948, Serial No. 18,684

21 Claims. (Cl. 219—4)

Our invention relates to timers and has particular relation to electronic timers for resistance welding systems.

Resistance welding systems constructed and operated in accordance with the teachings of the prior art of which we are aware include a plurality of timers which operate in sequence to perform the various functions of a complete welding operation. There is a Squeeze timer which determines the time interval between the closing of the start switch of the welder and the initiation of the flow of welding current; there is a Weld timer which determines the duration of the welding current flow; there is a Hold timer which determines the time interval between the termination of the flow of welding current and the instant when the welding electrodes begin to open; and there is an Off timer which after a predetermined time interval operates to reset the welding system for a new operation following each complete weld. In prior art welding systems, these timers operate in sequence. The start switch initiates the operation of the Squeeze timer, the Squeeze timer the operation of the Weld timer, the Weld timer the operation of the Hold timer, and the Hold timer the operation of the Off timer. Such welding systems, operate satisfactorily to produce welds at the rate of the order of 200 per minute. At higher rates they fail and produce streaks of oxidized metal instead of lines of properly fused spots.

It is accordingly an object of our invention to provide a timing system for high speed welding.

Another object of our invention is to provide a welding system that shall be capable of producing welds at a rate substantially greater than 200 per minute.

A specific object of our invention is to provide a welding system capable of producing at least 450 spots per minute in the welding of 20 gauge mild steel of the type which is commonly used in the manufacture of automobiles.

An ancillary object of our invention is to provide a precise high speed sequence timing system.

Another ancillary object of our invention is to provide a novel electronic timing system.

A further ancillary object of our invention is to provide a novel relay circuit, particularly adapted for use in a high speed timing system.

Still another ancillary object of our invention is to provide a timing system which shall be selectively operable in high speed or low speed welding.

Our invention is an outgrowth of our discovery that the failure of the prior art welding system to produce welds at a high rate arises from the failure of the welding electrodes of a welding system to follow the commands of the timing system. We have found that the prior art timing system when disconnected from the welding machine can be set so that it performs its sequential functions with a periodicity substantially greater than 200 per minute. When a timing system so set is connected to a welder the welding system so produced does not operate satisfactorily. From these findings we have deduced that the failure of the prior art welding systems at high speeds arises from the sluggishness in the mechanisms interconnecting the welding electrodes and the timing system.

We provide, in accordance with the broad aspects of our invention, a timing system which actuates the welding electrode moving mechanisms to open the electrodes while the welding current is still flowing. The moving mechanisms then start their opening operation during the welding interval. Before they complete this operation and open the electrodes, the welding current interval has terminated.

Welder systems, which embody this provision, according to our experience operate satisfactorily in the production of long series of welds. However, in situations where the operation of the welding system is repeatedly stopped and reinitiated, we have noted that the material is burned at isolated spots. Extended study of this difficulty, has led us to the realization that the isolated burned spots arise from the intermittent stopping and restarting of the system. Before a high speed welding operation starts, the welding electrodes are at rest spaced a substantial distance. Between Weld intervals, during a high speed operation, the electrodes have time to separate only to a substantially shorter distance during the short Off intervals. The Squeeze timer is set for this shorter distance between the electrodes and it initiates current flow through the welding electrodes soon after they start to close. If the initial squeeze time is equal to the squeeze time between welds during the welding operation, the welding current flows through the welding electrodes before they close during the initial weld and the resulting arc between the movable electrode and the material produces a burned spot rather than a fused spot.

In accordance with the specific aspects of our invention, we provide a Squeeze timer which introduces a different time interval between the closing of the start switch and the first weld than it does between welds. This object may be accomplished by providing separate relays for actuating the Squeeze timer at the beginning of the welding operation and between welds during a welding operation. The first relay may be actuated by operation of the start switch of the welding system and may operate in a time interval corresponding to the initial large spacing between the welding electrodes. The second relay may be actuated from the Off timer and may operate in a short time interval corresponding to the short spacing between the welding electrodes in the interval between welds. This arrangement we have found to be on the whole satisfactory. However, where high precision welding is desired, we prefer to provide a separate timing mechanism, such as a thermal timer for timing the first Squeeze interval. After the first weld, this mechanism is shunted out, and the Squeeze interval is initiated by a relay actuated by the Off timer.

We have found further that unsatisfactory welds may be produced during a high speed welding operation by reason of uncertainty in the operation of electromagnetic relays. According to our experience, such a relay pulls in precisely when its solenoid is properly energized, but it does not drop out at a precisely predictable instant following the interruption of current flow through its solenoid.

In accordance with another specific aspect of our invention we assure that the critical timing intervals are initiated by the pulling in rather than the dropping out of an electromagnetic relay. Where such timing is in prior art systems initiated by normally closed contacts of a relay, we have provided a pair of parallel contacts which are closed by operation of a second relay.

We have found that unreliability in the operation of a high speed welder is produced by the bouncing of the contacts which actuate the welding electrode closing mechanism and close the welding current contactor. In accordance with our invention we have provided parallel pairs of contacts at these points in the welding system.

The novel features that we consider characteristic of our invention are set forth with particularity in the appended claims. The invention itself, however, both as to its organization and its method of operation, together with additional objects and advantages thereof, will be understood from the following description of a specific embodiment when read in connection with the accompanying drawing, in which the single figure is a diagrammatic view of a preferred embodiment of our invention.

The apparatus shown in the drawing comprises a welding gun 1 having a pair of relatively movable electrodes 3 and 5 respectively. The material 7 to be welded is disposed on the lower electrode 5, and the upper electrode 3 is moved into engagement with the work hydraulically by compressed air or other fluid. The pressure of the fluid is controlled by a solenoid 9.

The welding electrodes 3 and 5 are connected across the secondary 11 of a welding transformer. The primary 13 of the transformer is supplied from an alternating current source (not shown) through a contactor 15 which in accordance with the preferred practice of our invention is of the electronic type. The latter comprises a pair of ignitrons 17 connected in antiparallel between one terminal of the source and the load. Firing current for these ignitrons is supplied through rectifier networks 19.

The ignitron contactor 15 shown is one of a number of components of this type which may be utilized in the practice of our invention. For example, an ignitron contactor having a thyratron firing network which includes heat control functions may be utilized. In accordance with the broader aspects of our invention, the contactor may also be of the electromagnetic type.

The operation of the welder and the solenoid 9 and the contact 15 are controlled from a timing system including a Squeeze timer 21, a Weld timer 23, a Hold timer 25 and an Off timer 27. Each of the timers includes a separate thyratron (31, 33, 35 and 37 respectively); each thyratron having an anode 39, a cathode 41, and a control electrode 43. The cathodes 41 of the thyratrons 31 to 37 are connected together to a line conductor 45 connected to the intermediate tap of the secondary 47 of a transformer. The anode 39 of each thyratron is connected to the exciting coil of a relay (51, 53, 55 and 57 respectively).

Each of the timers 21 to 27 is provided with a capacitor-resistor timing network 61, 63, 65 and 67 respectively. The Squeeze network 61 includes a capacitor 69 shunted by a rheostat or voltage divider 71 and a resistor 73. The other timing networks 63, 65 and 67 include only a capacitor 69 shunted by a voltage divider 71. The time interval produced by the Squeeze timer is dependent on the time required for the capacitor 69 to discharge through the rheostat 71 and resistor 73 (if it is not short circuited). At the will of the operator, the resistor 73 may be shunted out. The Squeeze time interval may therefore be a relatively short interval when the switch is closed or a longer interval when the switch is open. The important features of this aspect of our system are disclosed in an application Serial No. 692,403, filed August 22, 1946, to Edward C. Hartwig and assigned to Westinghouse Electric Corporation.

The Squeeze timing network 61 is connected at one terminal to the control electrode 43 of the Squeeze thyratron 31. At the other terminal, it is connected through a resistor 75, normally closed contact 77 of a start relay 79 normally closed contactor 81 of the Off relay 57 to a line conductor 83 and through two resistors 85 and 87 respectively, to another line conductor 89. The first line conductor 83 is connected through a resistor 91 to a terminal tap of the secondary 47. The second line conductor 89 is connected through a resistor 93 to the junction of a resistor 95 and a capacitor 97 which are connected across the secondary 47.

The timing networks 63, 65 and 67 of the Weld, Hold and Off timers 23, 25 and 27 respectively are similarly connected. At one terminal each of the respective networks is connected to the control electrode 43 of the corresponding thyratron; at the other terminal, each is connected to a junction which is in turn connected to the upper line conductor 89 through a pair of resistors 85 and 87, and to the lower line conductor 83 through a resistor 75 and contactors of the timer relays 51, 53, 55 and 57.

Asymmetrically conductive voltage regulators 99 and 101 are oppositely connected between the line conductors 45 and 83 and 45 and 89, respectively. These regulators with the other components of the timing system improve the precision of its operation. The important features involving the voltage regulators 99 and 101 are disclosed in a copending application, Serial No. 16,860, filed March 24, 1948, to Edward C. Hartwig and assigned to Westinghouse Electric Corporation.

The capacitor 69 of the Squeeze network 61 is charged by current flow between the control electrode 43 and the cathode 41 of the Squeeze thyratron 31 during the half periods of the supply when the control electrode is positive relative to the cathode. The polarity of the charge is such that a negative bias is impressed between the control electrode 43 and the cathode 41, and the thyratron 31 is maintained nonconductive. The capacitors 69 of the Weld, Hold and Off networks 63 to 67 are similarly charged.

The potential derived from the line conductor 89 is superimposed upon the bias potential. So long as the capacitors 69 remain charged the potential from line conductor 89 is insufficient to counteract the bias potential. However, when the charging is interrupted the bias potential is dissipated through the voltage dividers 71 and the potential derived from the conductor 89 becomes effective.

The resistor-capacitor network 95, 97 introduces a phase lead preferably of the order of 45° to 90° in the potential which is derived from line conductor 89 relative to the potential derived from the secondary 47. The former potential is impressed in the control circuits of the thyratron 31 to 37 and controls their firing. The latter potential is impressed on the anodes of the thyratrons. Because of the phase lead the anode potential rises from a negative magnitude to a positive magnitude (passes through zero) after the control potential has reached a positive, and preferably its maximum positive, magnitude. The thyratrons are rendered conductive substantially at the beginning of their positive half periods and the maximum available current is supplied to actuate the relays 51, 53, 55 and 57. The timing therefore has the precision necessary for high speed welding.

While the phase shift network 95, 97 is shown as interposed in the control supply for the thyratrons, our invention should not be limited to this showing. The phase shift network may be interposed in the anode supply or separate networks may be interposed in both anode and control supplies.

To initiate the operation of the welding system, a trigger switch 103 is closed at the welding gun 1. The closing of this switch completes a circuit extending from the upper terminal of the secondary 47 through the switch 103, a conductor 105, the heating winding 107 of a normally open thermal relay, the exciting coil of an auxiliary relay 111, to the lower tap of the secondary. Because the heating windings 107 of the thermal relay absorb substantial potential, the auxiliary relay 111 remains deenergized. Its lower normally closed contactor 113 shunts the contactor 77 of the start relay 79, since the contactor 81 of the Off relay 57 is closed.

By the closing of the trigger switch 103, a circuit is also closed from the center line conductor 45 through the exciting coil of a start relay 79, normally closed contactor 115 of the Hold relay 55, a conductor 117, the switch 103 to the upper terminal of the secondary 47. The start relay 79 is thus energized immediately following the actuation of the trigger 103 and its upper normally open double contactor 119 closes, closing a circuit through the fluid pressure solenoid 9. Fluid is supplied to move the movable welding electrode 3 into engagement with the work 7. Another normally open contactor 121 of the start relay 79 also closes, shunting out the trigger switch 103. The normally closed contactor 77 of the start relay opens, opening a connection from the Squeeze networks 61 to the line conductor 83. However, the Squeeze network remains connected to the lower line conductor 83 through the normally closed contactor 113 of the auxiliary relay 111.

The thermal timer (107) is set to afford sufficient time for the electrode 3 to engage the work 7 from its rest position. It operates immediately after the work is engaged closing its thermal contacts 122 to shunt out the heater 107. Now the auxiliary relay 111 draws sufficient current to be actuated closing its normally open contactor 123 to shunt out the thermal contacts 122 and opening its normally closed contacts 113 to break the connection between the Squeeze network 61 and the line conductor 83. The capacitor 69 in the Squeeze network now discharges through the voltage divider 71. After the welding electrode 3 engages the work, the back pressure of the fluid closes the back pressure switch 125 of the welding system.

After a time interval predetermined by the setting of the voltage divider 71, in the Squeeze network the Squeeze thyratron becomes conductive. Current now flows from the upper terminal of the secondary 47 through the now closed contactor 121 of the start relay 79, the back pressure contacts 125, the exiciting coil of the Squeeze relay 51, the thyratron 31 to the center line conductor 45. The Squeeze relay is actuated, and its normally open contactor 127 closes. Current then flows in a circuit from the upper terminal of the secondary 47 through the now closed contactor 121 of the start relay 79, the back pressure contacts 125, the exiciting coil of the ignitron contactor relay 129, the now closed contactor 127 of the Squeeze relay 51, a normally closed contactor 131 of the Weld relay 53 to the center line conductor 45. The double contactor 133 of the ignitron contactor relay 129 now close the firing circuits 19, firing the ignitrons 17 and the latter are rendered conductive to supply current to the primary 13 of the welding transformer.

A pair of normally closed contactors 135 and 137 of the Squeeze relay 51 also open when it is actuated. One of these contactors 135 on opening breaks the connection between the Weld network 63 and the lower line conductor 83. The capacitor 69 of the Weld network therefore discharges, and after a predetermined interval, the Weld thyratron 33 is rendered conductive. The other of these contactors 137 simultaneously breaks the connection between the Hold network 65 and the lower line conductor 83. The capacitor in this network therefore discharges, and after a predetermined time interval, the Hold thyratron 35 is rendered conductive. The Squeeze relay 51 accordingly starts both the Weld and the Hold timing operations. The Weld and the Hold time intervals are set for the welding speed desired. Where very high speed is desired, the Hold time is of shorter duration than the Weld time. If necessary, delay may be introduced between the opening of contactor 137 and that of contactor 135 so that the Hold Time starts to time before the Weld Time.

When the Weld thyratron 33 becomes conductive, current flows through the coil of the Weld relay 53 in a circuit extending from the upper terminal of the secondary 47 through the still closed contactor 121 of the start relay 79, the back pressure contacts 125, the exciting coil of the Weld relay 53, and the thyratron 33. The normally closed contactor 131 of the Weld relay 53 opens, opening the circuit through the electronic contactor relay 129. The latter drops out and current flow through the ignitrons 17 is discontinued. Before, at the same time as, or shortly after the Weld thyratron 33, depending on the desired speed of operation of the welder, the Hold thyratron 35 is rendered conductive. A circuit is closed through the exiciting coil of the Hold relay 55 which extends from the upper tap of the secondary 47 through the still closed contactor 121 of the start relay, the exciting coil of the Hold relay 55, the Hold thyratron 35 to the center line conductor 45. A normally closed contactor 139 of the Hold relay 55 opens and breaks the connection between the Off network 67 and the lower line conductor 83 and starts the Off timing interval. The normally closed contactor 115 of the Hold relay 55 also opens, opening the circuit through the coil of the start relay 79. The start relay now drops out and its double contactor 119 reopens starting the welding electrode reopening operation. If the Hold time is shorter than the Weld time this operation starts before the welding current ceases flowing. The lock-in contactor 121 of the start relay 79 also opens but in the normal operation of the gun welder 1 it is shunted by the trigger switch 103. The normally closed contactor 77 of the start relay 79 recloses, reestablishing the connection between the Squeeze network 61 and the lower line conductor 83. The Squeeze thyratron is now rendered nonconductive and the Squeeze relay drops out. The Hold thyratron 35 continues conductive in spite of the fact that Squeeze relay contactor 137 recloses because the connection between the Hold networks 65 and the lower line conductor 83 is maintained open at one of its now open contactors 141 of the Hold relay.

The Off thyratron 37 is rendered conductive after a predetermined time interval determined by the voltage divider 71 in the Off network 67. The Off relay 57 is now actuated in a circuit extending from the upper tap of the secondary 47 through the trigger switch 103, which remains closed, the conductor 117, the exciting coil of the Off relay 57, the Off thyratron 37 to the center line conductor 45. One of the normally open contactors 143 of the Off relay 57 now closes, reestablishing the connection between the Hold network 65 and the lower line conductor 83. The capacitor 69 of the Hold network is now recharged and in a short time interval, the Hold thyratron 35 is rendered nonconductive, and the Hold relay 55 drops out. A second normally open contactor 145 of the Off relay also closes, shunting the contactor 115 of the Hold relay 55 and closing an auxiliary circuit through the exciting coil of the start relay 79, which is independent of the circuit through the normally closed contactor 115. The start relay is accordingly reenergized by the positive and precise actuation of the Off relay 57 rather than by a less precise dropping out of the Hold relay 55 and initiates the reclosing of the welding electrode 3 for the second weld.

A normally closed contactor 81 of the Off relay 57 is opened. Since the contactor 113 of the auxiliary relay 111 between the Squeeze network 61 and the lower line conductor 83 is at this time open, the opening of the contactor 81 breaks the connection between the Squeeze network 61 and the lower line conductor 83. The Squeeze timing is accordingly initiated by the positive actuation of the Off relay 57 and not at a later instant by the actuation of the start relay 79. Where high speed operation is desired this saving in time is an important item. With the contactor 113 open the operation of the Squeeze timer is determined, not by the thermal timer 107—121, but by the Hold and Off networks 55 and 57. The latter are set to correspond to the short distance by which the welding electrode 3 is separated from the work 7 after the first weld is completed.

When the Hold thyratron 35 becomes nonconductive, the Hold relay 55 is deenergized, and its normally closed contactor 139 recloses the connection between the Off network 67 and the lower line conductor 83. The Off thyratron 37 is now rendered nonconductive and the Off relay 57 drops out. However, the Squeeze timing continues because the connection between the Squeeze network 61 and the lower line conductor 83 is open at the now opened contactor 77 of the start relay 79. The start relay 79, now energized, reinitiates a welding operation. The welding electrode 3 is closed, the welding current flows for a predetermined time interval, and the remaining steps of the above described process are repeated.

Since the Hold timing may start simultaneously with (or even before) the Weld timing, the opening of the welding electrodes may start while the welding current is still flowing. The sluggishness in the mechanisms for actuating the electrodes is compensated by initiation of the operation while welding current is flowing. The effect of any bouncing arising from the high speed operation of the contactors of the start relay 79 and of the electronic contactor relay 129, is suppressed by the provision of the double contactors 119 and 133, respectively. The probability that both contactors will open simultaneously during the bouncing is very small. Therefore in spite of the bouncing the current required for the respective operations continues to flow.

We have operated a system of the type described above from a commercial 60 cycle source with the timers set as follows:

Squeeze—1st weld 4 cycles, succeeding welds 2 or 3 cycles
Weld—2 or 3 cycles
Hold—1 or 2 cycles
Off—less than 3 cycles.

Total time for one weld after the first-duration of 8 cycles of the source. With such a setting 450 welds per minute can accordingly be produced.

It often happens that a timing system in accordance with our invention designed for high speed operation may be used for low speed operation with a costly welding press. Under such circumstances, the welding press would be damaged if the timing system were connected for high speed operation. That the operating personnel will on each occasion take the trouble to rewire a system designed for high speed operation so that it may be properly used for low speed operation, is highly unlikely. Accordingly, unless precautions are taken the mere presence of a high speed timing system in a shop may result in damage of a costly press.

To decrease the probability of such an occurrence, we provide a switching mechanism 147 (or a jumper) for readily converting our high speed timing system to low speed operation. When the system is set for high speed operation the switch 147 is in the position shown in the drawing. In this position it shunts out a normally closed contactor 149 of the Weld relay 53 which is connected to the lower line conductor 83. When the system is set for low speed operation the switch 147 is set in its other position. In this position the switch opens the shunt and connects the contactor 149 to the Hold network 65; it also shunts out the normally closed contactor 137 of the Squeeze relay 51 which in the high speed position of the switch operates to disconnect the Hold network 65 from the lower line conductor 83. With the switch 147 connected in the last described manner, the system operates in the same manner as ordinary prior art timing system with the Squeeze, Weld, Hold and Off operations occurring in succession.

Another protective feature of our system involves the cooperation between the Hold Squeeze, Weld and Hold timers and start relay 79 when the system is set for high speed operation. With the system so set the Weld timer may be set accidentally for an excessively long interval. If current were permitted to flow during such intervals it would damage the material or a costly press. In accordance with our invention, the Hold timer operates a short time (2 or 3 periods) after the Weld interval starts causing the relay 79 to drop out. The Squeeze relay 51 is then deenergized and opens the ignitron firing circuit 19. The welding current thus flows only during a few periods rather than the long time interval (which could be as high as 30 periods) for which the Weld timer is accidentally set. The damage to the material or press is therefore minimized.

Although we have shown and described certain specific embodiments of our invention, we are fully aware that many modifications are practicable. Our invention therefore is not to be restricted except in so far as is necessitated by the prior art and by the spirit of the appended claims.

We claim as our invention:

1. Apparatus for controlling a welding system having welding electrodes, a starter for actuating said electrodes to close, and a contactor for controlling the current flow through said electrodes; comprising in combination a Squeeze timer coupled to said starter for causing said contactor to transmit current through said electrodes a predetermined time interval after actuation of said starter; a Weld timer for timing the duration of said current; a Hold timer for timing the interval during which said electrodes are in engagement; and connections for initiating the timing operation of said Weld and Hold timers substantially simultaneously.

2. Apparatus for controlling a welding system having welding electrodes, a starter for actuating said electrodes to close, and a contactor for controlling the current flow through said electrodes; comprising in combination a Squeeze timer coupled to said starter for causing said contactor to transmit current through said electrodes a predetermined time interval after actuation of said starter; a Weld timer for timing the duration of said current; a Hold timer for timing the interval during which said electrodes are in engagement; and connections for initiating the timing operation of said Hold timer at latest substantially simultaneously with said Weld timer.

3. Apparatus for controlling a welding system having welding electrodes, a starter for actuating said electrodes to close, and a contactor for controlling the current flow through said electrodes; comprising in combination a Squeeze timer coupled to said starter for causing said contactor to transmit current through said electrodes a predetermined time interval after actuation of said starter; a Weld timer for timing the duration of said current; a Hold timer for timing the interval during which said electrodes are in engagement, said Hold timer being set for a substantially shorter interval than said Weld timer; and connections for initiating the timing operation of said Hold timer at latest substantially simultaneously with said Weld timer.

4. Apparatus for controlling a welding system having welding electrodes, a starter for actuating said electrodes to close, and a contactor for controlling the current flow through said electrodes; comprising in combination a Squeeze timer coupled to said starter for causing said contactor to transmit current through said electrodes a predetermined time interval after actuation of said starter; a Weld timer for timing the duration of said current; a Hold timer for timing the interval during which said electrodes are in engagement; and a selector including connections to be set at the will of the operator, either to initiate the timing operation of said Hold timer at latest substantially simultaneously with said Weld timer or to initiate said Hold timer after the conclusion of the Weld time.

5. A sequence timer for a welder including a Weld timer having a time determining network, a Hold timer having a time determining network, said Hold timer being set for a shorter time interval than said Weld timer, and a starter including a relay for actuating said timers to initiate Weld and Hold timings, Hold timing being initiated at latest simultaneously with Weld timing, said sequence timer being characterized by a second relay having contact means in said time determining network of said Hold timer, said contact means being adapted to reset said Hold timer for a second timing operation when said second relay is energized.

6. A sequence timer for a welder including a Weld timer having a normally closed time-determining network which when open performs a timing operation, a Hold timer having a normally closed time-determining network which when open performs a timing operation, said Hold timer being set for a shorter time interval than said Weld timer, and a starter including a relay having normally closed contacts in the circuit of the time-determining networks of said Weld and Hold timers connected to actuate said timers to initiate Weld and Hold timings by the opening of said normally closed contacts, Hold timing being initiated at latest simultaneously with Weld timing; characterized by a second relay having normally open contacts in circuit with the time-determining network of said Hold timer which last-named contacts when closed by the energization of said second relay shunt said normally closed contacts of the time-determining network of said Hold timer to reset said Hold timer for another operation by the closing of said normally open contacts while said normally closed contacts in the time determining network of said Hold timer are open.

7. A sequence timer for a welder including a Weld timer having a normally closed time-determining network which when open performs a timing operation, a Hold timer having a normally closed time-determining network which when open performs a timing operation, and a starter including a relay having normally closed contacts in circuit with the time-determining networks of said Weld and Hold timers connected to actuate said timers to initiate Weld and Hold timings by the opening of said normally closed contacts, Hold timing being initiated at latest simultaneously with Weld timing; characterized by a second relay having normally open contacts in circuit with the time-determining network of said Hold timer which last-named contacts when closed by the energization of said second relay shunt said normally closed contacts of said Hold time-determining network to reset said Hold timer for another operation by the closing of said contacts while said normally closed contacts on the Hold time-determining network are open.

8. Apparatus for controlling a high speed welder having welding electrodes, a mechanism for closing said electrodes and a contactor for conducting welding current through said electrodes; comprising in combination, a starter for initiating operation of said mechanism; a Weld timer for actuating said contactor to transmit current through said electrodes; a Hold timer, said Hold timer being actuated at least simultaneously with said Weld timer and having a timing interval of shorter duration than said Weld timer; a relay having normally closed contacts in circuit with said starter actuable by said Hold timer to open said contacts and terminate operation of said mechanism; and a second relay having normally open contacts in circuit with said starter actuable after said operation is terminated to close said contacts and reinitiate operation of said mechanism.

9. In combination, an electric discharge device having a control electrode, an anode, and a cathode; first, second, and third terminals for connection to a power supply; a capacitor resistor network; conductors including a switch for connecting the first of said terminals, said network and said control electrode and said cathode in series; connections, including provisions for actuating said switch, between said second and third terminals and between said anode and cathode, and a timer connected to said first and second terminals including contacts in shunt with said switch.

10. In a welding system, apparatus including timers for timing the functions of Squeeze, Weld, Hold, and Off, a switch for initiating the operation of said apparatus, means responsive to operation of said switch for actuating said Squeeze timer, means responsive to expiration of the Squeeze time for simultaneously actuating said Weld and Hold timers, and means responsive to expiration of the Hold time for actuating said Off timer.

11. In a welding system, apparatus including timers for timing the functions of Squeeze, Weld, and Hold, a first switch for initiating operation of said apparatus, means responsive to operation of said switch for actuating said Squeeze timer, first relay means responsive to expiration of the Squeeze time having first contacts for initiating said Weld timer and second contacts for initiating said Hold timer, second relay means responsive to expiration of the Weld time for actuating said Hold timer, and a switch for shunting said second contacts, whereby said Hold timer may be actuated either by said first relay means or said second relay means, according to the will of the operator.

12. Apparatus for controlling the operation of a welding system, comprising in combination a sequence timer including Squeeze, Weld and Off timing means, a switch for initiating operation of said timer, time delay means connected to be energized responsive to operation of said switch and having contacts connected to initiate operation of said Squeeze timing means for the first timing sequence only, and relay means energized responsive to energization of said Off timing means and having contacts connected to initiate operation of said Squeeze timing means for subsequent timing sequences.

13. Apparatus for controlling a welding system, comprising in combination a sequence timer comprising Weld, Hold and Off timing means, a thyratron, having an anode, a cathode and a control electrode, associated with each of said timing means, each said timing means including a time constant network connected in the control electrode circuit of its respective thyratron, means connected to supply anode voltage to said thyratrons, means for applying a potential in series with each respective control electrode, time constant network and cathode to cause said control element to be biased negative with respect to said cathode, a relay connected to be energized responsive to conduction of the thyratron associated with said Off timing means, said relay having normally open contacts connected in series with said potential means and the control electrode of the thyratron associated with said Hold timing means.

14. Apparatus for controlling a welding system, comprising in combination a sequence timer comprising Squeeze, Weld, Hold and Off timing means, means to initiate operation of said sequence timer, means responsive to energization of said Squeeze timing means, for actuating means to initiate welding current flow, and for substantially simultaneously initiating operation of said Weld and Hold timing means, and means responsive to energization of said Hold time means for actuating means to open the welding electrodes, whereby the welding electrode opening means may be actuated prior to expiration of the weld time.

15. A sequence timer for timing a total time interval, comprising at least three timing means each of which is adapted to time a sub-time interval, means responsive to energization of each timing means for actuating a load device at the end of its respective sub-time interval, means responsive to energization of one of said timing means for simultaneously initiating operation of two timing means which immediately follow in the sequence, and means associated with one of said two timing means for independently adjusting the length of its sub-time interval, whereby its sub-time interval may be selectively adjusted to expire either before, simultaneously with, or after the sub-time interval of the other of said two timing means.

16. A sequence timer for timing a total time interval, comprising at least three timing means each of which is adapted to time a sub-time interval, means associated with each of said timing means for independently adjusting the length of its respective sub-time interval, means responsive to energization of each timing means for actuating a load device at the end of its respective sub-time interval, means responsive to energization of one of said timing means for simultaneously initiating operation of two timing means which immediately follow in the sequence, whereby the sub-time interval of one of said last-mentioned timing means may be selectively adjusted such that its sub-time interval will expire either before, simultaneously with, or after the sub-time interval of the other of said two timing means.

17. A sequence timer for timing a total time interval, comprising at least three timing means, each of said timing means including an electrical time constant network, each of said timing means being adapted to time a sub-time interval, including an electric discharge device connected in circuit with each of said timing means, operable responsive to energization of respective timing means for actuating a respective relay means at the end of its sub-time interval, means responsive to energization of one of said timing means for simultaneously initiating operation of two timing means which immediately follow in the sequence, and means associated with one of said two timing means for independently adjusting the length of its sub-time interval, whereby its sub-time interval may be selectively adjusted to expire either before, simultaneously with, or after the sub-time interval of the other of said two timing means.

18. In combination, a circuit comprising a load device adapted for connection to a source of electric energy, normally open contacts connected in series with said load device, normally closed contacts connected in parallel with said normally open contacts, a first timing means for timing a first interval, a second timing means for timing a second interval, means connected to initiate operation of said first and second timing means, means connected to be actuated responsive to termination of said first time interval for opening said normally closed contacts to deenergize said load device, and means connected to be actuated responsive to termination of said second time interval for closing said normally open contacts to energize said load device.

19. In combination, an electric discharge device having an anode, a cathode and a control electrode; a capacitor-resistor network having an appreciable time constant; a switch having normally closed contacts; means for actuating said switch; terminals for connection to a power supply; conductors connecting said terminals, switch, network, control electrode, and cathode in series; a relay having normally closed and normally open contacts, and an operating coil; a thermal time delay relay comprising a heating element, a bimetallic element to be heated by said heating element and normally open contacts in shunt with said heating element to be actuated by said bimetallic element; conductors connecting the normally open contacts of said relay in shunt with said heating element; conductors connecting said heating element and said relay operating coil in series; and conductors connecting the normally closed contacts of said relay in shunt with the normally closed contacts of said switch.

20. In combination, a pair of terminals for connection to a potential source, a heater impedance, a relay having an energizing coil and normally open contacts, said heater impedance being connected in series with said relay energizing coil between said terminals, said relay contacts being connected in shunt with said heater impedance, a thermostatic device located so as to be actuated by heat from said heater impedance, said thermostatic device having normally open contacts connected in shunt with said relay contacts.

21. Apparatus for controlling the operation of a relay having an energizing coil in a high speed timer in which contacts of the relay are actuated to effect a timing operation; comprising, in combination, a thyratron having an anode, a cathode and a control electrode; a supply transformer including a secondary having terminal taps and an intermediate tap; means connecting said coil, said cathode, said anode, said intermediate tap and one of said terminal taps in a series circuit, said anode being electrically nearer said one tap than said cathode; a capacitor and a resistor connected in series at one each of their ends; means for connecting the other end of said capacitor to said one terminal tap; means for connecting the other end of said resistor to the other terminal tap and means for connecting the junction of the resistor and capacitor to said control electrode, said capacitor and resistor being dimensioned to produce a substantial phase displacement between a potential impressed between said terminal taps and the resulting potential between said intermediate tap and the junction of said capacitor and resistor.

EDWARD C. HARTWIG.
ROBERT F. BARRELL.

References Cited in the file of this patent

UNITED STATES PATENTS

| Number | Name | Date |
|---|---|---|
| 1,516,646 | Roseby | Nov. 25, 1924 |
| 1,893,223 | Burkle | Jan. 3, 1933 |
| 2,008,413 | Dawson | July 16, 1935 |
| 2,071,773 | Sidney | Feb. 23, 1937 |
| 2,094,388 | Unger | Sept. 28, 1937 |
| 2,127,216 | Hallden | Aug. 16, 1938 |
| 2,140,387 | Juchter | Dec. 13, 1938 |
| 2,239,053 | Roby | Apr. 22, 1941 |
| 2,279,311 | Gross | Apr. 14, 1942 |
| 2,295,601 | Overbeck | Sept. 15, 1942 |
| 2,298,570 | Leathers | Oct. 13, 1942 |
| 2,306,237 | Wolfner | Dec. 22, 1942 |
| 2,315,916 | Whiteley et al. | Apr. 6, 1943 |
| 2,333,363 | Callow | Nov. 2, 1943 |
| 2,353,980 | Weisglass | July 18, 1944 |
| 2,361,172 | Brown | Oct. 24, 1944 |
| 2,390,981 | Bivens | Dec. 18, 1945 |
| 2,404,643 | Livingston | July 23, 1946 |
| 2,431,284 | Stadum | Nov. 18, 1947 |
| 2,433,845 | Hayes | Jan. 6, 1948 |
| 2,435,515 | Rosser | Feb. 3, 1948 |
| 2,443,660 | Large et al. | June 22, 1948 |
| 2,459,041 | Mitsch | June 11, 1949 |
| 2,476,882 | Lexa | July 19, 1949 |
| 2,477,511 | Comb | July 26, 1949 |

OTHER REFERENCES

General Electric Review, vol. 32, No. 7, July 1929, pp. 390–395. Reprinted in "General Electric Company Research Laboratory," June 1930, No. 491, pp. 14–19.